(12) United States Patent
Kimbrough et al.

(10) Patent No.: US 6,619,230 B1
(45) Date of Patent: Sep. 16, 2003

(54) INTEGRATED SCOOP APPARATUS AND METHOD

(76) Inventors: Mark S. Kimbrough, 316 N. Lamar Blvd., Austin, TX (US) 78703; Pearce R. Jones, 316 N. Lamar Blvd., Austin, TX (US) 78703

(*) Notice: Subject to any disclaimer, the term of this patent is extended or adjusted under 35 U.S.C. 154(b) by 0 days.

(21) Appl. No.: 10/201,847

(22) Filed: Jul. 24, 2002

(51) Int. Cl.$^7$ .............................. A01K 5/00; A01K 5/01
(52) U.S. Cl. ........................................ 119/61; D30/129
(58) Field of Search ........................ 119/61, 72, 161; 294/55; 425/221; 37/411; D30/129, 162; D7/566, 548, 577, 583, 648, 647, 681; 4/645

(56) References Cited

U.S. PATENT DOCUMENTS

| | | |
|---|---|---|
| D150,917 S | 9/1948 | Berg |
| 3,611,998 A | 10/1971 | Loscalzo |
| D226,838 S | 5/1973 | Ruskin |
| D230,034 S * | 1/1974 | Goldman et al. .......... D30/129 |
| D254,754 S | 4/1980 | Harrison |
| D256,173 S * | 7/1980 | Rigney ...................... D30/162 |
| 5,285,749 A * | 2/1994 | Byer ............................ 119/61 |
| 5,294,467 A * | 3/1994 | Hoodes ........................ 294/55 |
| D353,518 S | 12/1994 | Cautereels et al. |
| D370,749 S | 6/1996 | Lillelund et al. |
| D403,921 S * | 1/1999 | Zirbes .......................... D7/566 |
| 5,857,427 A * | 1/1999 | Kelley .......................... 119/61 |
| D415,657 S * | 10/1999 | Cornelissen ................. D7/566 |
| 6,209,487 B1 | 4/2001 | Quinlan et al. |
| D467,044 S * | 12/2002 | Tangolics .................... D30/129 |

FOREIGN PATENT DOCUMENTS

FR   2689367 A1 * 10/1993 ............ A01K/1/01

* cited by examiner

Primary Examiner—Charles T. Jordan
Assistant Examiner—Elizabeth Shaw
(74) Attorney, Agent, or Firm—J. Nevin Shaffer, Jr.

(57) ABSTRACT

An integrated scoop apparatus and method, in a container with a circumferential upper edge and a base, includes an integrated raised portion connected to the circumferential upper edge above the circumferential upper edge. An access port is provided in the integrated raised portion and conformed to accommodate a user's hand. In a further aspect of the invention, a support device is connected to the base of the container.

18 Claims, 4 Drawing Sheets

INTEGRATED SCOOP APPARATUS AND METHOD

FIELD OF THE INVENTION

This invention relates to an integrated scoop apparatus and method. In particular, the invention relates to an integrated scoop apparatus and method in a container with a circumferential upper edge and a base. An integrated raised portion is connected to the circumferential upper edge above the circumferential upper edge. An access port is provided in the integrated raised portion and conformed to accommodate a user's hand.

BACKGROUND OF THE INVENTION

One of man's first utensils may have been a container for food and/or water. Over the course of human history, containers have changed very little even though they come in a dizzying array of sizes and shapes and are made of every type of material.

A problem does exist however with the use of a common container and/or bowl. The basic problem is that of getting material, food stuffs, and the like into the bowl. By way of example only, and not by limitation, millions of people every day face the task of preparing food for their pets. Nearly every pet owner has, at one time or the other, purchased pet food in bulk. It is not uncommon for individuals to buy pet food in twenty-five, fifty and even one hundred pound bags, for example. At this point, the user must get the food in manageable quantities into the bowl. In order to accomplish this, users typically employ a separate scoop. The scoop is often cumbersome, prone to being misplaced, and difficult to easily locate next to the food source.

An associated problem is the fact that many containers, bowls, and so forth are difficult to manipulate particularly when filling them with food stuffs. Additionally, prior art bowls and containers are difficult and/or awkward to handle after they are filled with food.

SUMMARY OF THE INVENTION

Accordingly, the integrated scoop apparatus and method of the present invention includes, in a container with a circumferential upper edge and a base, an integrated raised portion connected to the circumferential upper edge above the circumferential upper edge. An access port is provided in the integrated raised portion and conformed to accommodate a user's hand.

In another aspect of the invention, the access port further includes a palm support. In one aspect of the invention, the access port is conformed to provide four finger access to a user's hand. In another aspect of the invention, a support device for supporting the container is attached to the bottom of the container. In one aspect of this invention, the support device includes two side supports and a flat base support. In another aspect of the invention, the support device includes two pairs of side supports. In another aspect of the invention, the support device includes an integrated side support and a flat base support.

In a further aspect of the invention, the container includes an inner liner and an outer liner attached to the inner liner. In one aspect of this invention, the inner liner is stainless steel and the outer liner is plastic. In a further aspect of the invention, the support device is rubber.

In another embodiment of the invention, in a bowl with a circumferential upper edge and a base, an integrated bowl scoop apparatus includes an integrated raised portion connected to the circumferential upper edge above the circumferential upper edge. An access port is provided in the integrated raised portion and conformed to accommodate a user's hand. A support is attached to the bottom of the bowl for supporting the bowl.

In one aspect of the invention, the access port further includes a palm support. In another aspect of the invention, the access port is conformed to provide four finger access to a user's hand.

In a further aspect of the invention, the support includes two side supports and a flat base support. In another aspect of the invention, the support includes two pairs of side supports. In a further aspect of the invention, the support includes an integrated side support and a flat base support. In another aspect of the invention, the bowl includes an inner liner and an outer liner attached to the inner liner.

In another embodiment of the invention, in bowls with a circumferential upper edge and a base, an integrated bowl scoop method includes the steps of connecting an integrated raised portion to the circumferential upper edge above the circumferential edge. An access port is formed in the integrated raised portion. The access port is conformed to accommodate a user's hand. Supports are attached to the bottom of the bowl. The bowl is grasped with the access port. Food is scooped with the bowl and the bowl is placed on its supports on a surface.

In a further aspect of the invention, the bowl is constructed of an inner stainless steel liner and a plastic outer liner is attached to the stainless steel inner liner.

DESCRIPTION OF THE DRAWINGS

Other objects, features, and advantages of the present invention will become more fully apparent from the following detailed description of the preferred embodiment, the appended claims and the accompanying drawings which:

DETAILED DESCRIPTION OF THE INVENTION

Figure 1:
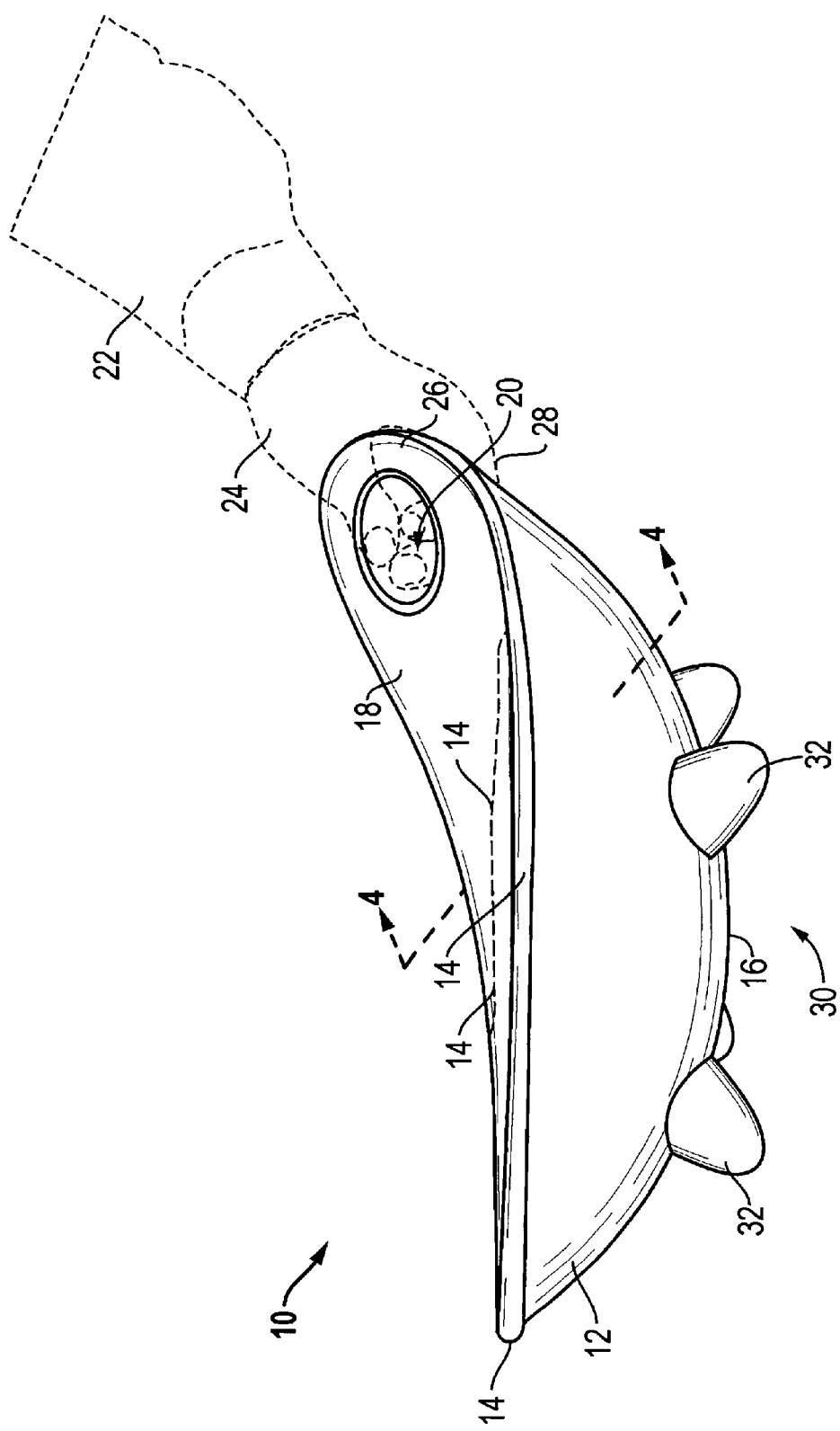
FIG. 1 is a perspective view of the integrated scoop apparatus of the present invention.

The preferred embodiment of the present invention is illustrated by way of example in FIGS. 1–4. With specific reference to FIG. 1, the integrated scoop apparatus 10 of the present invention includes a container 12 with a circumferential upper edge 14. Further, container 12 includes a base 16. An integrated raised portion 18 is connected to the circumferential upper edge 14 above the circumferential upper edge 14. Access port 20 is provided in the integrated raised portion 18 and is conformed to accommodate a user's 22 hand 24.

In another aspect of the invention, access port 20 includes a palm support 26. In a further aspect of the invention, access port 20 is conformed to provide access for four fingers 28 of user's 22 hand 24.

In a further aspect of the invention, a support 30 is connected to the base 16 of container 12. In the aspect of the invention illustrated in FIG. 1, support 30 takes the form of two pairs of side supports 32.

As illustrated in the figures, container 12, in a preferred embodiment, takes the form of a bowl. Certainly any form of container 12 useful in the presentation of food (not shown) is; suitable for the purposes of this invention. Additionally, food is understood in this application to include solid and liquid food stuffs such as dry food and milk. Again, for the purposes of explanation only, container 12 in accordance with the present invention is useful for the presentation of food to humans and/or animals. Additionally, the integrated scoop apparatus 10 of the present invention may be utilized in any situation where an integrated handle is useful. For example, integrated scoop 10 has application for use in the construction industry for scooping and delivering mortar mix.

Still referring to FIG. 1, circumferential upper edge 14 is a discrete upper edge at the front 34 of container 12. Thereafter, in this illustration, circumferential upper edge 14 is connected to integrated raised portion 18 in such a manner that circumferential upper edge 14 is no longer actually visible. For the purposes herein, the term "integrated" reflects this merger between circumferential upper edge 14 and the integrated raised portion 18. As shown in the figures, it is not possible to see where one begins and one leaves off. Certainly, any means of connecting an integrated raised portion 18 to circumferential upper edge 14 is acceptable for the purposes of the invention. Nonetheless, in the preferred embodiment, circumferential upper edge 14 melds with and is absorbed by integrated raised portion 18 so that a seamless container 12 is presented.

Again by way of further explanation, access port 20 may be understood to be a void or a hole in the integrated raised portion 18. Access port 20 provides the ability for a user to lift, manipulate, maneuver and otherwise control container 12 as desired. In this regard, even when not "scooping" food by means of the present invention, access port 20 provides increased control of container 12.

Figure 2:
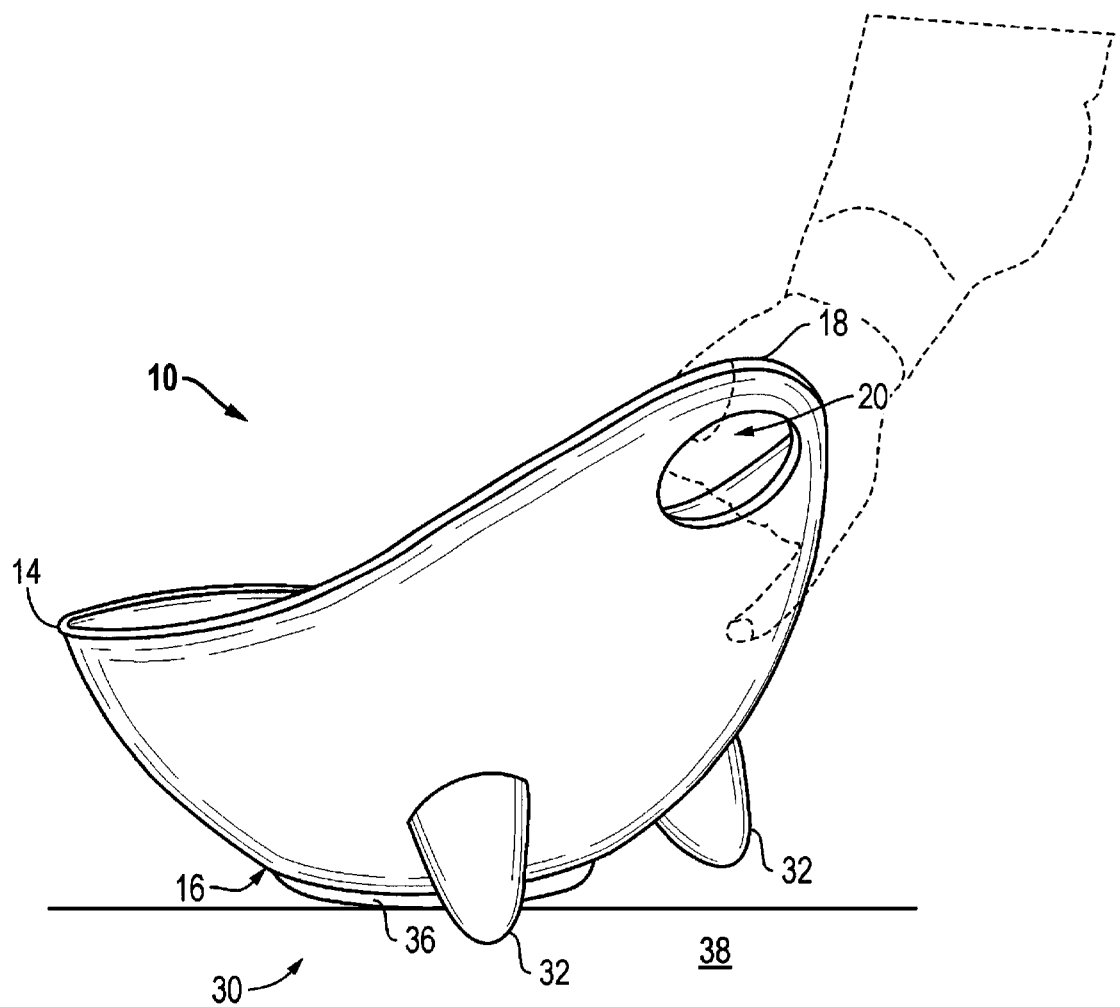
FIG. 2 is a perspective view of another embodiment of the invention of FIG. 1.

Referring now to FIG. 2, another embodiment of the integrated scoop apparatus 10 of the present invention is illustrated. In this embodiment, support 30 includes two side supports 32 and a flat base support 36. As opposed to the support illustrated in FIG. 1, this support 30 configuration provides essentially a tripod support enabling container 12 to rest safely on essentially any surface 38 without fear that container 12 will tip over. This is particularly useful, for example, when the integrated scoop 10 of the present invention is utilized for serving food to pets.

Figure 3:
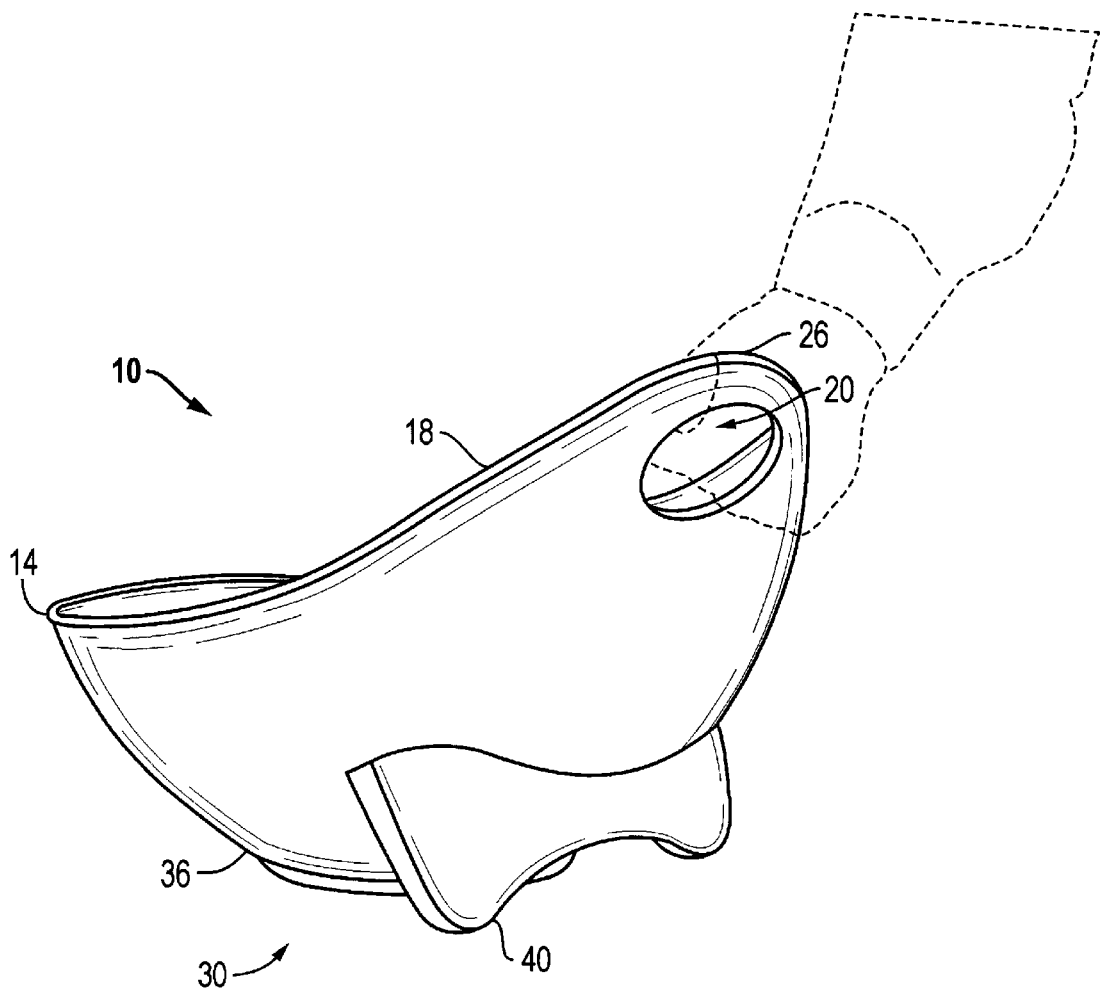
FIG. 3 is a perspective view of another embodiment of the invention of FIG. 1.

Referring to FIG. 3, another embodiment of the invention is illustrated whereby support 30 takes the form of an integrated side support 40 and a flat base support 36. As compared to the supports 30 shown in FIGS. 1 and 2, integrated side support 40 does not include two distinct side supports 32. Instead, integrated side support 40 is more or less one continuous side support.

Figure 4:
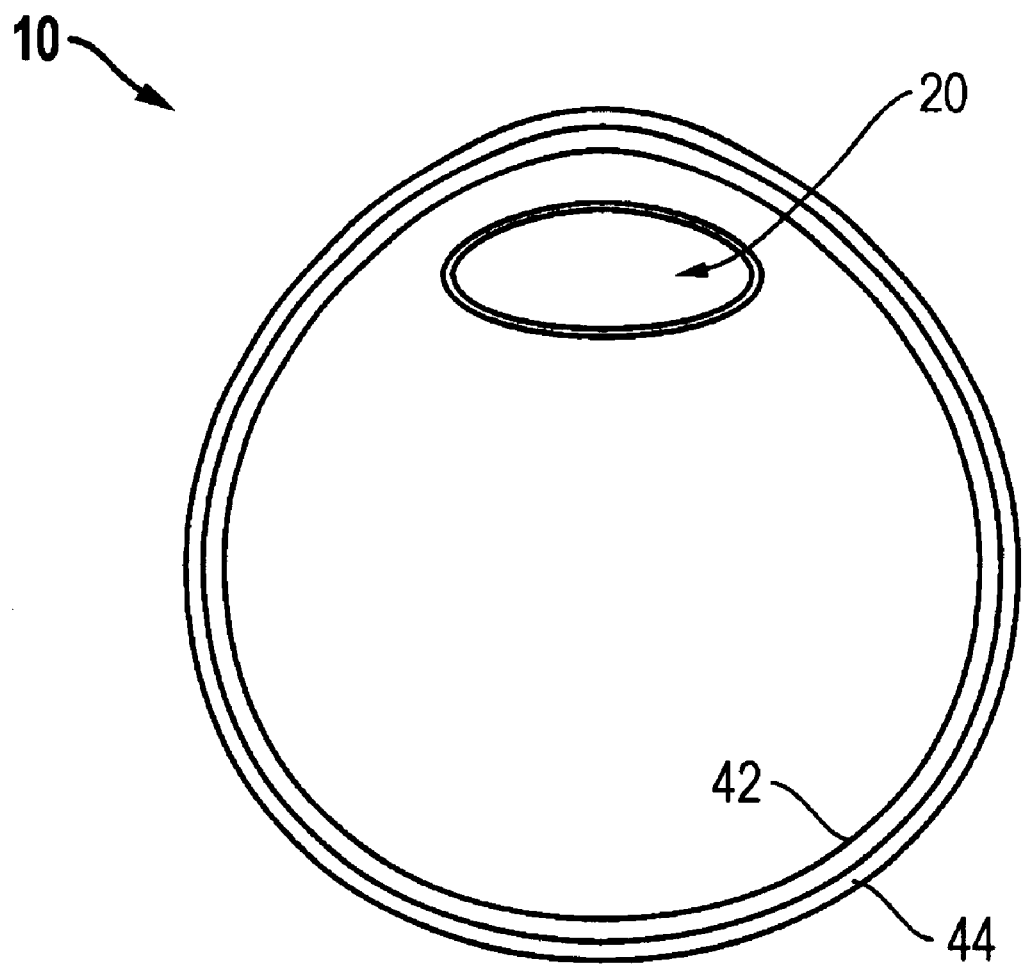
FIG. 4 is a front section view taken along lines 4—4 of FIG. 1 illustrating the inner and outer liner of the present invention.

Referring now to FIG. 4, another embodiment of the invention is illustrated. Again, FIG. 4 is taken along lines 4—4 of FIG. 1. This cut away view illustrates another aspect of the invention wherein container 12 includes an inner liner 42 to which is attached an outer liner 44. In one aspect of the invention, inner liner 42 is made of stainless steel and outer liner 44 is made of plastic. Certainly, inner liner 42 and outer liner 44 may be made of any suitable materials now known or hereafter developed. Likewise, supports 30 may be made of any desirable materials such as rubber, plastic, metal, and the like, now known or hereafter developed.

The description of the present embodiment of the invention have been presented for purposes of illustration but are not intended to be exhaustive or to limit the invention to the form disclosed. Many modifications and variations will be apparent to those of ordinary skill in the art. As such, while the present invention has been disclosed in connection with the preferred embodiment thereof, it should be understood that there may be other embodiments which, fall within the spirit and scope of the invention as defined by the following claims.

What is claimed is:

1. In a container with a circumferential upper edge and a base, an integrated scoop apparatus, the apparatus comprising:
   a) an integrated raised portion connected to said circumferential upper edge and extending above said circumferential upper edge;
   b) an access port in said integrated raised portion conformed to accommodate a user's hand; and
   c) wherein said container further comprises an inner liner and an outer liner attached to said inner liner.

2. The apparatus of claim 1 wherein said access port further comprises a palm support.

3. The apparatus of claim 1 wherein said access port is conformed to provide four finger access to a user's hand.

4. The apparatus of claim 1 further comprising a support means for supporting said container attached to the bottom of said container.

5. The apparatus of claim 4 wherein said support means comprises two side supports and a flat base support.

6. The apparatus of claim 4 wherein said support means comprises two pairs of side supports.

7. The apparatus of claim 4 wherein said support means comprises an integrated side support and a flat base support.

8. The apparatus of claim 4 wherein said support means is rubber.

9. The apparatus of claim 1 wherein said inner liner is stainless steel.

10. The apparatus of claim 1 wherein said outer liner is plastic.

11. In a bowl with a circumferential upper edge and a base, an integrated bowl scoop apparatus, the apparatus comprising:
    a) an integrated raised portion connected to the circumferential upper edge and extending above the circumferential upper edge;
    b) an access port in said integrated raised portion conformed to accommodate a user's hand;
    c) a support attached to the bottom of the bowl for supporting the bowl; and
    d) wherein the bowl further comprises an inner liner and an outer liner attached to the inner liner.

12. The apparatus of claim 11 wherein the access port further comprises a palm support.

13. The apparatus of claim 11 wherein the access port is conformed to provide four finger access to a user's hand.

14. The apparatus of claim 11 wherein the support comprises two side supports and a flat base support.

15. The apparatus of claim 11 wherein the support comprises two pairs of side supports.

16. The apparatus of claim 11 wherein the support comprises an integrated side support and a flat base support.

17. In bowls with a circumferential upper edge and a base, an integrated bowl scoop method, the method comprising the steps of:
    a) connecting an integrated raised portion to the circumferential upper edge above the circumferential edge;

b) forming an access port in the integrated raised portion;
c) conforming the access port to accommodate a user's hand;
d) attaching supports to the bottom of the bowl;
e) grasping the bowl with the access port;
f) scooping food with the bowl; and
g) placing the bowl supports on a surface.

18. The method of claim 17 further comprising the steps of:
a) constructing the bowl of an inner stainless steel liner; and
b) attaching a plastic outer liner to the inner stainless steel liner.

* * * * *